United States Patent
Saito et al.

(10) Patent No.: US 11,445,527 B2
(45) Date of Patent: Sep. 13, 2022

(54) USER TERMINAL AND CHANNEL ESTIMATION METHOD

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 109 days.

(21) Appl. No.: 16/622,599

(22) PCT Filed: Jun. 15, 2017

(86) PCT No.: PCT/JP2017/022228
§ 371 (c)(1),
(2) Date: Dec. 13, 2019

(87) PCT Pub. No.: WO2018/229957
PCT Pub. Date: Dec. 20, 2018

(65) Prior Publication Data
US 2020/0221476 A1 Jul. 9, 2020

(51) Int. Cl.
*H04W 72/12* (2009.01)
*H04L 5/00* (2006.01)
(Continued)

(52) U.S. Cl.
CPC ....... *H04W 72/1263* (2013.01); *H04L 5/0051* (2013.01); *H04L 5/10* (2013.01); *H04L 25/0204* (2013.01)

(58) Field of Classification Search
CPC .... H04W 72/1263; H04L 5/0051; H04L 5/10; H04L 25/0204
See application file for complete search history.

(56) References Cited

U.S. PATENT DOCUMENTS

| 2016/0087709 A1 | 3/2016 | Horiuchi et al. | |
| 2019/0222460 A1* | 7/2019 | Kim | H04L 27/265 |
| 2021/0105113 A1* | 4/2021 | Saito | H04W 72/04 |

FOREIGN PATENT DOCUMENTS

WO  WO-2014130082 A1 *  8/2014  ......... H04L 5/0082

OTHER PUBLICATIONS

Extended European Search Report issued in counterpart European Patent Application No. 17913472.1, dated Dec. 9, 2020 (8 pages).
(Continued)

*Primary Examiner* — Justin T Van Roie
(74) *Attorney, Agent, or Firm* — Osha Bergman Watanabe & Burton LLP

(57) ABSTRACT

This user terminal is equipped with a receiving unit which receives, from a base station device, a downlink signal which includes a demodulation reference signal for a plurality of ports multiplexed in the time direction; a control unit which separates, from the downlink signal, the demodulation reference signal for the port assigned to the host device; and a channel estimation unit which calculates a channel estimation value using the separated demodulation reference signal. The control unit specifies the multiplexing method for the plurality of ports selected on the basis of at least one of carrier frequency, propagation environment, user terminal performance and base station performance, and separates the demodulation reference signal according to the specified multiplexing method.

2 Claims, 8 Drawing Sheets

(51) Int. Cl.
*H04L 5/10* (2006.01)
*H04L 25/02* (2006.01)

(56) References Cited

OTHER PUBLICATIONS

NTT DOCOMO, Inc. (Rapporteur); "RAN WG's progress on NR WI in the April meeting 2017"; 3GPP TSG-RAN WG2 #98, R2-1704137; Hangzhou, China; May 15-19, 2017 (32 pages).
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," Jun. 2016 (310 pages).
International Search Report issued in International Application No. PCT/JP2017/022228, dated Aug. 15, 2017 (5 pages).
Written Opinion issued in International Application No. PCT/JP2017/022228; dated Aug. 15, 2017 (3 pages).

\* cited by examiner

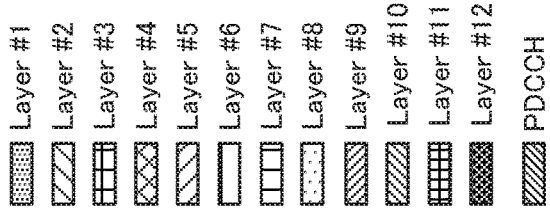
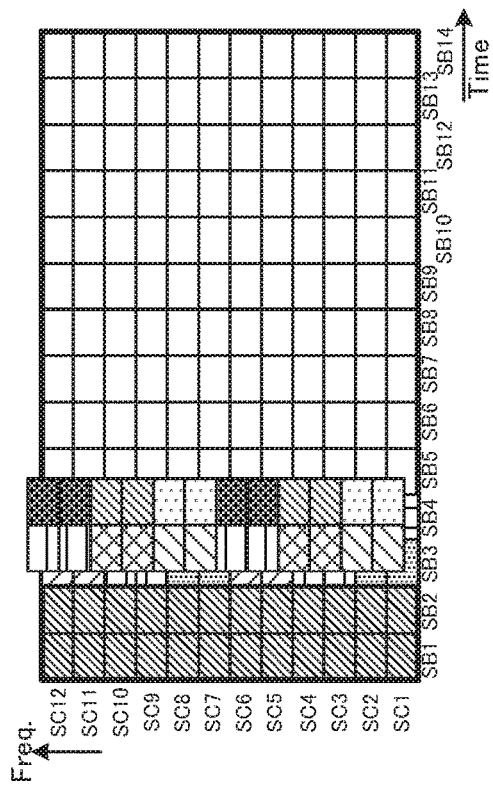
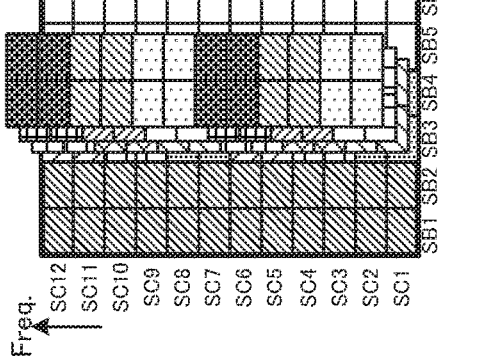
FIG. 5

USER TERMINAL AND CHANNEL ESTIMATION METHOD

TECHNICAL FIELD

The present invention relates to a user terminal and a channel estimation method.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT)), and the like.

Future radio communication systems (for example, 5G) are expected to support a wide range of frequencies from a low carrier frequency to a high carrier frequency. For example, because a propagation path environment (for example, communication quality and frequency selectivity) and/or requirements (such as moving speed of a supported terminal) are greatly differ for each frequency band such as a low carrier frequency or high carrier frequency, future radio communication systems are desired to flexibly support arrangement (mapping) of reference signals and the like.

For example, in future radio communication systems, it is studied to support a plurality of multiplex methods for multiplexing reference signals (for example, demodulation reference signals) of a plurality of layers (a plurality of ports) in a time direction.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016.

SUMMARY OF INVENTION

Technical Problem

However, a switching method for switching among the plurality of multiplex methods expected to be supported is not sufficiently studied. Therefore, if reference signals that are not multiplexed by an appropriate multiplex method are received, channel estimation accuracy deteriorates.

The present invention has been made in view of the above points, and one object is to provide a user terminal and a channel estimation method that can appropriately switch a method for multiplexing reference signals of a plurality of layers (a plurality of ports) in the time direction.

Solution to Problem

A user terminal according to one aspect of the present invention includes: a reception section that receives, from a base station apparatus, a downlink signal including demodulation reference signals of a plurality of ports multiplexed in a time direction; a control section that demaps the demodulation reference signal of a port allocated to the user terminal from the downlink signal; and a channel estimation section that calculates a channel estimation value using the demapped demodulation reference signal, in which the control section identifies a multiplex method for the plurality of ports selected on the basis of at least one of a carrier frequency, propagation environment, performance of the user terminal, and performance of the base station apparatus, and demaps the demodulation reference signal according to the identified multiplex method.

Advantageous Effects of Invention

According to one aspect of the present invention, it is possible to appropriately switch a method for multiplexing reference signals of a plurality of layers (a plurality of ports) in the time direction.

BRIEF DESCRIPTION OF DRAWINGS

FIG. 5 is a diagram of mapping patterns illustrating an example of two multiplex methods in the time direction in configuration 2;

DESCRIPTION OF EMBODIMENTS

Hereinafter, each embodiment of the present invention will be described in detail with reference to the accompanying drawings.

(An Embodiment of the Present Invention)

Figure 1:
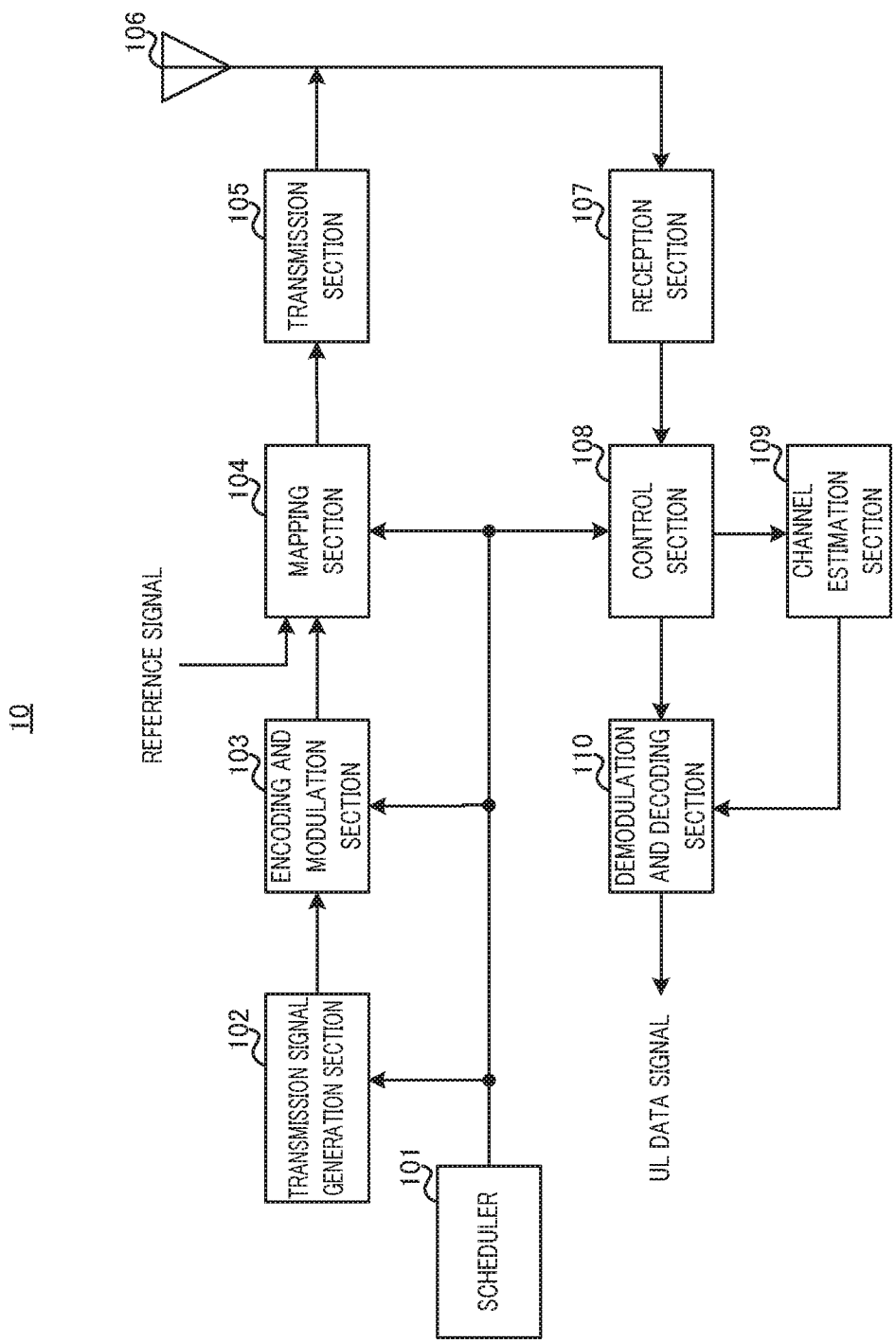
FIG. 1 is a block diagram illustrating an example of an overall configuration of a radio base station according to an embodiment of the invention.
Figure 2:
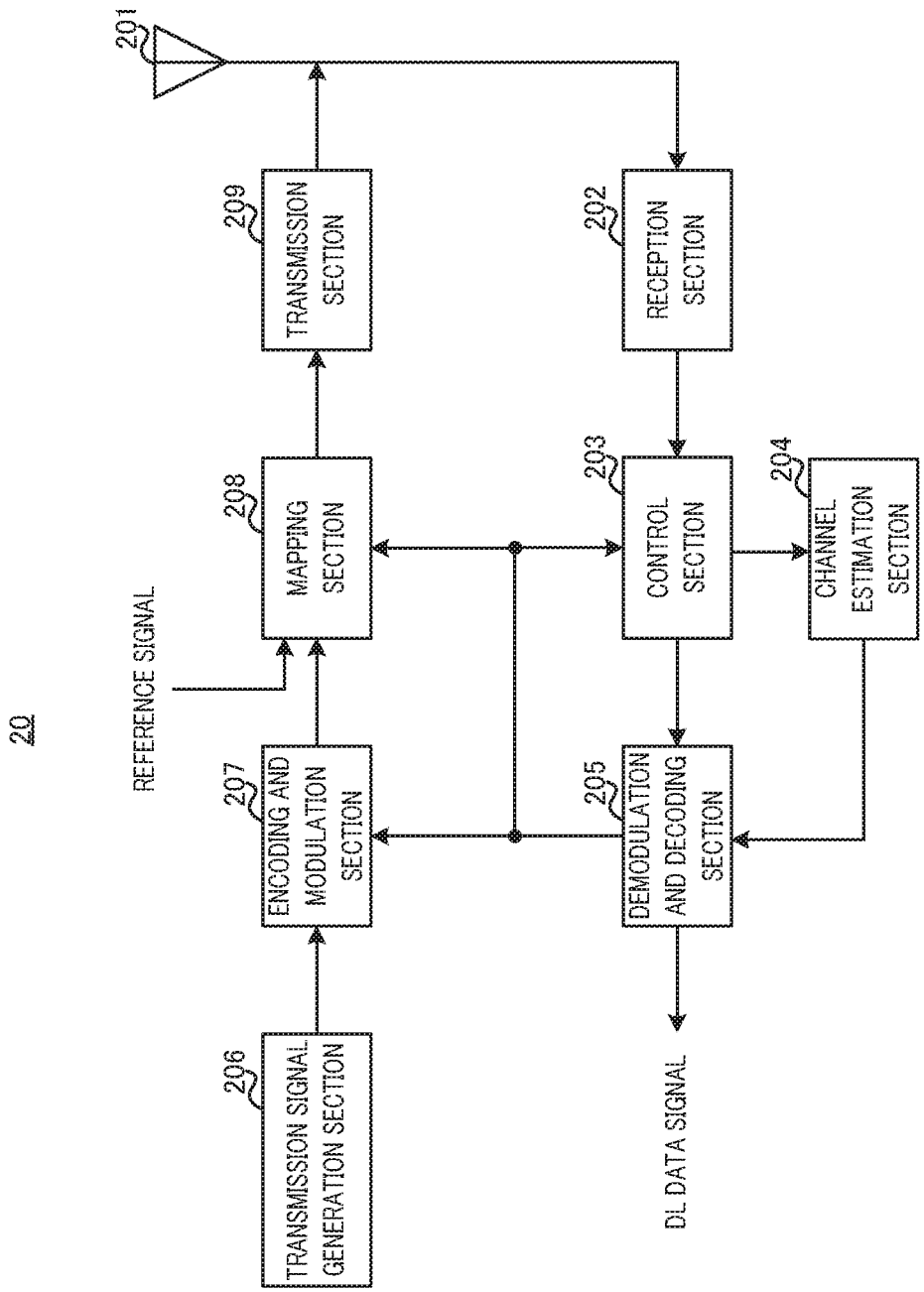
FIG. 2 is a block diagram illustrating an example of an overall configuration of a user terminal according to an embodiment of the invention.

A radio communication system according to the embodiment of the invention includes at least radio base station 10 (for example, also referred to as a gNB (gNode B) shown in FIG. 1 and user terminal 20 (for example, also referred to as UE (User Equipment) shown in FIG. 2. User terminal 20 is connected with radio base station 10.

To user terminal 20, radio base station 10 transmits a downlink (DL) control signal using a downlink control channel (for example, a Physical Downlink Control Channel (PDCCH)) and transmits a DL data signal and a demodulation reference signal (hereinafter DMRS) for demodulating the DL data signal using a downlink data channel (for example, a physical downlink shared channel (PDSCH)). User terminal 20 transmits, to radio base station 10, an uplink (UL) control signal using an uplink control channel (for example, a Physical Uplink Control Channel (PUCCH)) or uplink data channel (for example, a physical uplink shared channel (PUSCH)) and transmits a UL data signal and a DMRS using an uplink data channel (for example, a physical uplink shared channel (PUSCH)) to radio base station 10.

The radio communication system in the embodiment of the invention supports two types of configurations of a front-loaded DMRS. For each configuration, two multiplex methods are supported as layer multiplex methods (port multiplex methods) in a time direction. The port means a mapping pattern of DMRSs or the like logically allocated to each user terminal 20 at a plurality of layers. In the embodiment of the invention, it is explained that ports and layers correspond in a one-on-one manner, but the invention is not limited to this. The port and/or layer may be defined in different terms. Furthermore, the two types of configurations (configuration 1 and configuration 2) supported and specific examples of layer multiplex methods in the time direction will be described later.

Downlink channels and uplink channels through which radio base station 10 and user terminal 20 transmit and receive are not limited to the above-described PDCCH, PDSCH, PUCCH, PUSCH, and the like, and may be other channels, for example, a PBCH (Physical Broadcast Channel) and RACH (Random Access Channel).

In FIGS. 1 and 2, DL/UL signal waveforms generated by radio base station 10 and user terminal 20 may be signal waveforms based on OFDM (Orthogonal Frequency Division Multiplexing) modulation, may be signal waveforms based on SC-FDMA (Single Carrier-Frequency Division Multiple Access) or DFT-S-OFDM (DFT-Spread-OFDM), and may be other signal waveforms. In FIGS. 1 and 2, descriptions of constituent sections (for example, IFFT processing section, CP adding section, CP removal section, and FFT processing section) for generating signal waveforms are omitted.

<Radio Base Station>

FIG. 1 is a block diagram illustrating an example of an overall configuration of radio base station 10 according to the embodiment of the invention. Radio base station 10 shown in FIG. 1 adopts a configuration including scheduler 101, transmission signal generation section 102, encoding and modulation section 103, mapping section 104, transmission section 105, antenna 106, reception section 107, control section 108, channel estimation section 109, and demodulation and decoding section 110. Also, radio base station 10 may have a configuration of MU-MIMO (Multi-User Multiple-Input Multiple-Output) in which radio base station 10 simultaneously communicates with a plurality of user terminals 20 and may have a configuration of SU-MIMO (Single-User Multiple-Input Multiple-Output) in which radio base station 10 communicates with one user terminal 20.

Scheduler 101 performs scheduling (for example, resource allocation) of a DL signal (DL data signal, DL control signal, DMRS, and the like). Also, scheduler 101 performs scheduling (for example, resource allocation and layer (port) allocation) of a UL signal (UL data signal, UL control signal, DMRS, and the like).

In the scheduling, scheduler 101 configures the number of layers (the number of ports) allocated to user terminals 20.

Also in scheduling, scheduler 101 selects one from configuration 1 and configuration 2 as a configuration of a mapping pattern indicating a resource element to which the DMRS of the DL signal is mapped. For example, scheduler 101 selects one configuration from configuration 1 and configuration 2 on the basis of a propagation path environment (for example, communication quality and frequency selectivity) and/or requirements (such as moving speed of a supported terminal).

Scheduler 101 then selects a multiplex method (layer multiplex method) for DMRSs of a plurality of layers (a plurality of ports) in the time direction for the selected configuration. A selection method of a multiplex method will be described later.

Information (allocation information) on a port identification number allocated to user terminal 20 may be notified to user terminal 20 by, for example, upper layer (for example, RRC (Radio Resource Control) or MAC (Medium Access Control)) signaling, and may be notified to user terminal 20 by physical layer (PHY) signaling.

Scheduler 101 outputs scheduling information including the information (allocation information) on the port identification number allocated to user terminal 20, the selected configuration of the mapping pattern of DMRSs, and the layer multiplex method in the time direction to transmission signal generation section 102 and mapping section 104.

Scheduler 101 configures an MCS (Modulation and Coding Scheme) (such as a coding rate and modulation scheme) of each of the DL data signal and UL data signal on the basis of, for example, channel quality between radio base station 10 and user terminal 20, and outputs MCS information to transmission signal generation section 102 and encoding and modulation section 103. The MCS is not limited to being set by radio base station 10 and may be set by user terminal 20. When user terminal 20 configures an MCS, radio base station 10 may receive MCS information from user terminal 20 (not shown).

Transmission signal generation section 102 generates a transmission signal (including a DL data signal and DL control signal). For example, the DL data signal includes downlink control information (DCI) including the scheduling information (for example, resource allocation information on the DL data signal) or MCS information output from scheduler 101. Transmission signal generation section 102 outputs the generated transmission signal to encoding and modulation section 103.

Encoding and modulation section 103 performs encoding processing and modulation processing on the transmission signal input from transmission signal generation section 102 on the basis of, for example, the MCS information input from scheduler 101. Encoding and modulation section 103 outputs a transmission signal after modulation to mapping section 104.

Mapping section 104 maps the transmission signal input from encoding and modulation section 103 to a predetermined radio resource (DL resource) on the basis of the scheduling information (for example, DL resource allocation, port identification number allocated to user terminal 20, selected configuration of the mapping pattern of DMRSs, and layer multiplex method in the time direction) input from scheduler 101. Also, mapping section 104 maps a reference signal (for example, DMRS) to a predetermined radio resource (DL resource) on the basis of the scheduling information. Mapping section 104 outputs a DL signal mapped to the radio resource to transmission section 105.

Transmission section 105 performs transmission processing such as up-conversion and amplification on the DL signal input from mapping section 104 and transmits a radio frequency signal (DL signal) from antenna 106.

Reception section 107 performs reception processing such as amplification and down-conversion on a radio frequency signal (UL signal) received by antenna 106 and outputs the UL, signal to control section 108.

Control section 108 demaps (de-maps or separates) a UL data signal and a DMRS from the UL signal input from reception section 107 on the basis of the scheduling information (UL resource allocation) input from scheduler 101. Control section 108 then outputs the UL data signal to demodulation and decoding section 110 and outputs the DMRS to channel estimation section 109.

Channel estimation section 109 performs channel estimation using the DMRS of the UL signal and outputs a channel estimation value as an estimation result to demodulation and decoding section 110.

Demodulation and decoding section 110 performs demodulation and decoding processing on the UL data signal input from control section 108 on the basis of the channel estimation value input from channel estimation section 109. Demodulation and decoding section 110 transfers a UL data signal after demodulation to an application section (not shown). The application section performs processing or the like relating to upper layers than a physical layer or MAC layer.

<User Terminal>

FIG. 2 is a block diagram illustrating an example of an overall configuration of user terminal 20 according to the embodiment of the invention. User terminal 20 shown in FIG. 2 adopts a configuration including antenna 201, reception section 202, control section 203, channel estimation section 204, demodulation and decoding section 205, transmission signal generation section 206, encoding and modulation section 207, mapping section 208, and transmission section 209.

Reception section 202 performs reception processing such as amplification and down-conversion on a radio frequency signal (DL signal) received by antenna 201 and outputs the DL signal to control section 203. The DL signal includes at least a DL data signal and a DMRS.

Control section 203 demaps a DL control signal and the DMRS from the DL signal input from reception section 202. Control section 203 then outputs the DL control signal to demodulation and decoding section 205 and outputs the DMRS to channel estimation section 204.

At that time, control section 203 controls reception of the DMRS from the DL signal on the basis of allocation information or the like notified in advance.

Control section 203 demaps the DL data signal from the DL signal on the basis of scheduling information (for example, DL resource allocation information) input from demodulation and decoding section 205, and outputs the DL data signal to demodulation and decoding section 205.

Channel estimation section 204 performs channel estimation using the demapped DMRS and outputs a channel estimation value as an estimation result to demodulation and decoding section 205.

Demodulation and decoding section 205 demodulates the DL control signal input from control section 203. Furthermore, demodulation and decoding section 205 performs decoding processing (for example, blind detection processing) on a DL control signal after demodulation. Demodulation and decoding section 205 outputs scheduling information (DL/UL resource allocation or configuration of the mapping pattern of DMRSs) destined to the user terminal itself obtained by decoding the DL control signal to control section 203 and mapping section 208, and outputs MCS information on a UL data signal to encoding and modulation section 207.

Also, demodulation and decoding section 205 performs demodulation and decoding processing on the DL data signal input from control section 203 using the channel estimation value input from channel estimation section 204 on the basis of MCS information on the DL data signal included in the DL control signal input from control section 203. Demodulation and decoding section 205 transfers a DL data signal after demodulation to an application section (not shown). The application section performs processing or the like relating to upper layers than the physical layer or MAC layer.

Transmission signal generation section 206 generates a transmission signal (including a UL data signal or UL control signal) and outputs the generated transmission signal to encoding and modulation section 207.

Encoding and modulation section 207 performs encoding processing and modulation processing on the transmission signal input from transmission signal generation section 206 on the basis of, for example, the MCS information input from demodulation and decoding section 205. Encoding and modulation section 207 outputs a transmission signal after modulation to mapping section 208.

Mapping section 208 maps the transmission signal input from encoding and modulation section 207 to a predetermined radio resource (UL resource) on the basis of the scheduling information (UL resource allocation) input from demodulation and decoding section 205. Also, mapping section 208 maps a reference signal (for example, a DMRS) to a predetermined radio resource (UL resource) on the basis of the scheduling information (for example, the configuration of the mapping pattern of DMRSs).

Transmission section 209 performs transmission processing such as up-conversion and amplification on the UL signal (at least including the UL data signal and DMRS) input from mapping section 208 and transmits a radio frequency signal (UL signal) from antenna 201.

The above-explained radio communication system including radio base station 10 and user terminal 20 supports two types of configurations of front-loaded DMRSs as described above. The two types of configurations (configuration 1 and configuration 2) supported will be explained below.

<Configuration 1 and Configuration 2>

Figure 3:
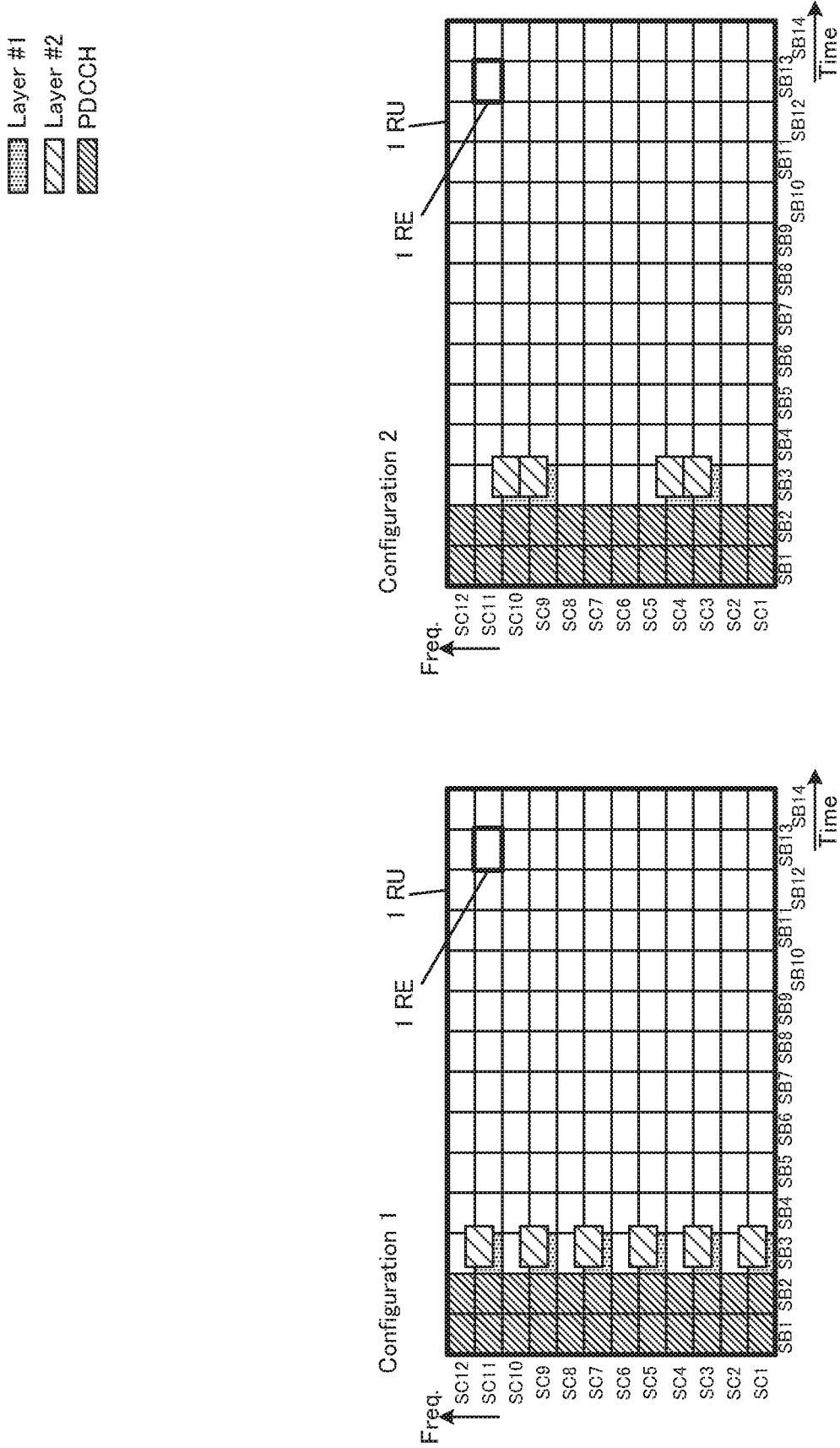
FIG. 3 illustrates an example of mapping patterns of two types of configurations supported.

FIG. 3 illustrates an example of mapping patterns of the two types of configurations supported. FIG. 3 illustrates mapping patterns of front-loaded DMRSs (hereinafter referred to simply as DMRSs for convenience of explanation) of layer #1 and layer #2. Each mapping pattern indicates a mapping position of a DMRS of each layer in a resource unit (RU) (also referred to as a resource block, resource block pair, and the like) which is a resource allocation unit.

The RU has a configuration in which 168 resource elements (REs) are arranged: 14 in the time direction and 12 in a frequency direction. One RE is a radio resource region defined by one symbol and one subcarrier. That is, one RU is composed of 14 symbols and 12 subcarriers.

In the following description, the 14 symbols in the time direction of the RU are referred to as SB1-SB14 in order from the left. The 12 subcarriers in the frequency direction of the RU are referred to as SC1-SC12 in order from the bottom.

A control signal channel (for example, PDCCH) is arranged on REs of first two symbols of the RU (that is, SB1 and SB2).

Configuration 1 supports up to eight layers (eight ports). Configuration 1 is based on IFDM (Interleaved Frequency Division Multiplexing) and has a configuration in which insertion density (an arrangement interval and the number in the frequency direction) of DMRSs per layer is relatively high. In the mapping pattern of configuration 1, DMRSs of the same layer are arranged at intervals of one subcarrier. This arrangement may be referred to as "comb 2."

Configuration 2 supports up to twelve layers (twelve ports). In configuration 2, DMRSs of one or more layers are arranged on two consecutive REs in the frequency direction. A DMRS of one layer arranged on two consecutive REs in the frequency direction is multiplexed with DMRSs of different layers by an OCC (Orthogonal Cover Code). Multiplexing by the OCC in the frequency direction will be referred to as FD-OCC as appropriate.

As described above, the radio communication system in the embodiment of the invention supports two multiplex methods as the layer multiplex methods in the time direction for each configuration. The layer multiplex methods in the time direction supported for each configuration will be described below.

<Example of Multiplex Method in Configuration 1>

Figure 4:
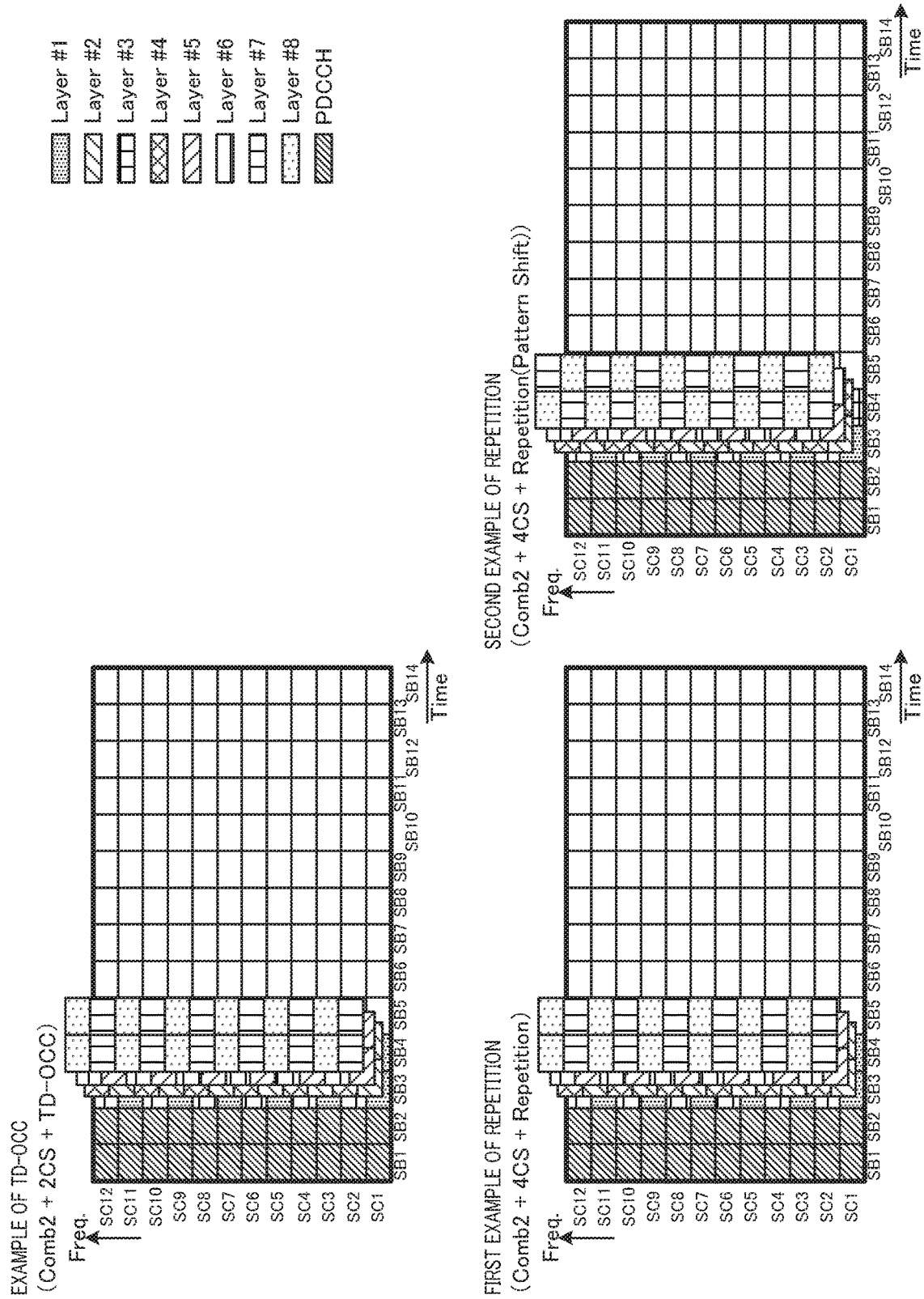
FIG. 4 is a diagram of mapping patterns illustrating an example of two multiplex methods in a time direction in configuration 1.

FIG. 4 is a diagram of mapping patterns illustrating an example of two multiplex methods in the time direction in configuration 1. For configuration 1, a multiplex method (TD-OCC) by the OCC in the time direction and a method (repetition) for repeating the same arrangement (or an arrangement in which the same arrangement is shifted) in the time direction are supported as multiplex methods in the time direction.

In an example of the TD-OCC, DMRSs of four layers are multiplexed on one symbol (SB3 in FIG. 4), and DMRSs of up to eight layers are multiplexed on two symbols by the OCC in the time direction. For example, in the example of FIG. 4, DMRSs of two layers (for example, layer #1 and layer #3) are frequency division multiplexed (FDM) and DMRSs of four layers (for example, layer #1, layer #2, layer #5, and layer #7) are multiplexed on the same RE. Multiplexing of DMRSs of four layers on the same RE is performed by cyclic shift (CS) and the TD-OCC.

In a first example of the repetition, DMRSs of eight layers are multiplexed on one symbol (SB3 in FIG. 4), and the same arrangement is repeated in the time direction (SB4 in FIG. 4). For example, in the example of FIG. 4, DMRSs of two layers (for example, layer #1 and layer #3) are frequency division multiplexed (FDM) and DMRSs of four layers are multiplexed on the same RE. Multiplexing of DMRSs of four layers on the same RE is performed by the cyclic shift (CS).

In a second example of the repetition, DMRSs of eight layers are multiplexed on one symbol (SB3 in FIG. 4), and an arrangement in which the same arrangement is shifted is repeated in the time direction (SB4 in FIG. 4). For example, in the example of FIG. 4, DMRSs of two layers (for example, layer #1 and layer #3) are frequency division multiplexed (FDM) and DMRSs of four layers (for example, layer #1, layer #2, layer #5, and layer #7) are multiplexed on the same RE. Multiplexing of DMRSs of four layers on the same RE is performed by the cyclic shift (CS).

<Example of Multiplex Method in Configuration 2>

FIG. 5 is a diagram of mapping patterns illustrating an example of two multiplex methods in the time direction in configuration 2. For configuration 2, the multiplex method (TD-OCC) by the OCC in the time direction and a multiplex method for performing time division multiplexing (TDM) on two consecutive symbols are supported as multiplex methods in the time direction.

In an example of the TD-OCC, DMRSs of six layers are multiplexed on one symbol (SB3 in FIG. 5), and DMRSs of up to twelve layers are multiplexed on two symbols by the OCC in the time direction. For example, in the example of FIG. 5, DMRSs of three layers (for example, layer #1, layer #3, and layer #5) are frequency division multiplexed (FDM) and DMRSs of four layers (for example, layer #1, layer #2, layer #7, and layer #8) are multiplexed on the same RE. Multiplexing of DMRSs of four layers on the same RE is performed by the FD-OCC and TD-OCC.

In an example of the TDM, DMRSs of six layers are multiplexed on one symbol (SB3 in FIG. 5), and DMRSs of up to twelve layers are multiplexed on two symbols by the TDM in the time direction. For example, in the example of FIG. 5, DMRSs of three layers (for example, layer #1, layer #3, and layer #5) in the frequency direction are frequency division multiplexed (FDM) and DMRSs of two layers (for example, layer #1 and layer #7) in the time direction are time division multiplexed (TDM), and DMRSs of two layers (for example, layer #1 and layer #2) are multiplexed on the same RE. Multiplexing of DMRSs of two layers on the same RE is performed by the FD-OCC.

As described above, a plurality of multiplex methods in the time direction are supported for each configuration, but a method (switching method) for selecting the multiplex methods has not been studied.

Scheduler 101 of radio base station 10 in the embodiment of the invention selects one multiplex method from the plurality of multiplex methods in the time direction on the basis of a carrier frequency, a propagation environment between user terminal 20 and radio base station 10, performance (for example, hardware performance) of user terminal 20, and performance (for example, hardware performance) of radio base station 10. Control section 203 of user terminal 20 identifies the selected one multiplex method from the plurality of multiplex methods in the time direction, and demaps a DMRS on the basis of the identified multiplex method.

Specifically, radio base station 10 selects either the mapping pattern of configuration 1 or the mapping pattern of configuration 2, and selects a multiplex method in the time direction supported for the selected configuration.

At that time, radio base station 10 uses any of three selection methods that will be described below to select a multiplex method in the time direction supported for each configuration.

<First Selection Method>

In a first selection method, radio base station 10 selects a multiplex method in the time direction depending on whether a PT-RS (Phase Tracking Reference Signal) exists (whether the PT-RS is used for communication) determined in a higher layer. The PT-RS is configured for each user terminal 20 in order to reduce phase noise caused by the hardware performance of radio base station 10 and/or the hardware performance of user terminal 20 and/or the carrier frequency and/or the like. Whether the PT-RS exists (whether the PT-RS is used for communication) is selected on the basis of the hardware performance of radio base station 10 and/or the hardware performance of user terminal 20 and/or the carrier frequency. This selection may be performed by radio base station 10 and may be performed by user terminal 20.

For example, in configuration 1, if the PT-RS exists (if the PT-RS is on), radio base station 10 selects the repetition as the multiplex method in the time direction. On the other hand, if the PT-RS does not exist (if the PT-RS is off), radio base station 10 selects the TD-OCC as the multiplex method in the time direction.

For example, in configuration 2, if the PT-RS exists (if the PT-RS is on), radio base station 10 selects the TDM as the multiplex method in the time direction. On the other hand, if the PT-RS does not exist (if the PT-RS is off), radio base station 10 selects the TD-OCC as a multiplex method in the time direction.

That is, if the PT-RS exists, in other words, if an impact of phase noise is large and the PT-RS is necessary, radio base station 10 does not select the TD-OCC, whereas if the PT-RS does not exist, in other words, if an impact of phase noise is small, radio base station 10 selects the TD-OCC.

Radio base station 10 transmits a DL signal including DMRSs mapped by applying the selected configuration and the selected multiplex method in the time direction to user terminal 20.

In the first selection method, the PT-RS is associated with the multiplex method in the time direction. Therefore, user terminal 20 may identify the multiplex method in the time direction selected by radio base station 10 on the basis of whether the PT-RS exists.

For example, if the PT-RS is not used for communication, control section 203 of user terminal 20 determines that the multiplex method in the time direction is the TD-OCC. If the PT-RS is used for communication, control section 203 determines that the multiplex method in the time direction is the repetition or TDM. Regarding the repetition or TDM, one of them is identified according to the configuration of the mapping pattern.

User terminal 20 then demaps the DMRS from the DL signal received from radio base station 10 on the basis of the multiplex method in the time direction identified. Thereby, user terminal 20 may identify the multiplex method selected by radio base station 10 without requiring receiving signaling from radio base station 10. Therefore, overhead of the signaling can be reduced.

In the first selection method, the multiplex method in the time direction may be notified by signaling. For example, if radio base station 10 applies MU-MIMO and multiplexes DMRSs for a plurality of user terminals 20, the multiplex method in the time direction may be notified to user terminals 20 by signaling in order to make multiplex methods in the time direction the same multiplex method. Thereby, even in the case where presence or absence of the PT-RS is different for each of a plurality of user terminals 20 to be multiplexed, the multiplex methods in the time direction can be made the same multiplex method.

<Second Selection Method>

In a second selection method, radio base station 10 compares a carrier frequency at which the RU including DMRSs is transmitted with a threshold value, and selects a multiplex method in the time direction according to height of the carrier frequency.

For example, in configuration 1, when the carrier frequency is relatively high (when the carrier frequency is equal to or more than the threshold value), radio base station 10 selects the repetition as the multiplex method in the time direction. On the other hand, when the carrier frequency is relatively low (when the carrier frequency is less than the threshold value), radio base station 10 selects the TD-OCC as the multiplex method in the time direction.

For example, in configuration 2, when the carrier frequency is relatively high (when the carrier frequency is equal to or more than the threshold value), radio base station 10 selects the TDM as the multiplex method in the time direction. On the other hand, when the carrier frequency is relatively low (when the carrier frequency is less than the threshold value), radio base station 10 selects the TD-OCC as the multiplex method in the time direction.

That is, when the carrier frequency is relatively high, in other words, when the carrier frequency is greatly affected by phase noise, radio base station 10 does not select the TD-OCC, whereas when the carrier frequency is relatively low, in other words when the carrier frequency is not affected very much by phase noise, radio base station 10 selects the TD-OCC.

Radio base station 10 transmits a DL signal including DMRSs mapped by applying the selected configuration and the selected multiplex method in the time direction to user terminal 20.

In the second selection method, the carrier frequency is associated with the multiplex method in the time direction. Therefore, user terminal 20 may identify the multiplex method in the time direction selected by radio base station 10 on the basis of height of the carrier frequency of the received DL signal.

For example, if the carrier frequency is less than the threshold value, control section 203 of user terminal 20 determines that the multiplex method in the time direction is the TD-OCC. If the carrier frequency is equal to or more than the threshold value, control section 203 of user terminal 20 determines that the multiplex method in the time direction is the repetition or TDM. Regarding the repetition or TDM, one of them is identified according to the configuration of the mapping pattern.

User terminal 20 then demaps the DMRS from the DL signal on the basis of the multiplex method in the time direction identified. Thereby, user terminal 20 may identify the multiplex method selected by radio base station 10 without requiring receiving signaling from radio base station 10. Therefore, overhead of the signaling can be reduced.

The threshold value compared with the carrier frequency in the second selection method may be predefined and may be notified by signaling. Also, it may be a common value in a cell and may be a different value for each user terminal 20. In the case of a different threshold value for each user terminal 20, the multiplex method in the time direction may be notified by signaling. For example, if radio base station 10 applies MU-MIMO and multiplexes DMRSs for a plurality of user terminals 20, the multiplex method in the time direction may be notified to user terminals 20 by signaling in order to make multiplex methods in the time direction the same multiplex method. Thereby, even if the threshold values are different among the plurality of user terminals 20 to be multiplexed, the multiplex methods in the time direction can be made the same multiplex method.

<Third Selection Method>

In a third selection method, radio base station 10 selects a multiplex method in the time direction with a predetermined criterion and notifies the selected multiplex method to user terminal 20 by upper layer signaling. In the following, as an example, an example in which radio base station 10 selects a multiplex method for each cell will be described.

For example, in configuration 1, radio base station 10 of cell #1 selects the repetition as the multiplex method in the time direction. On the other hand, radio base station 10 of cell #2 different from cell #1 selects the TD-OCC as the multiplex method in the time direction. In this case, radio base station 10 of cell #1 notifies by signaling that the repetition has been selected, and radio base station 10 of cell #2 notifies by signaling that the TD-OCC has been selected.

For example, in configuration 2, radio base station 10 of cell #1 selects the TDM as the multiplex method in the time direction. On the other hand, radio base station 10 of cell #2 different from cell #1 selects the TD-OCC as the multiplex method in the time direction. In this case, radio base station 10 of cell #1 notifies by signaling that the TDM has been selected, and radio base station 10 of cell #2 notifies by signaling that the TD-OCC has been selected.

In other words, radio base station 10 selects an appropriate multiplex method according to the carrier frequency of the cell, and/or propagation environment, and/or the like, and notifies the selected multiplex method by signaling.

Radio base station 10 transmits a DL signal including DMRSs mapped by applying the selected configuration and the selected multiplex method in the time direction to user terminal 20.

User terminal 20 receives the signaling related to the multiplex method in the time direction and determines the multiplex method in the time direction selected by radio base station 10. User terminal 20 then demaps the DMRS from the DL signal according to the multiplex method in the time direction determined.

In above-described configuration 1 and configuration 2, the mapping patterns in the RU having the configuration in which 168 REs are arranged: 14 in the time direction and 12 in the frequency direction have been described, but the invention is not limited to this. For example, the invention is also applied to mapping of DMRSs in a resource allocation unit referred to as a mini-slot. Examples in which the resource allocation unit is the mini-slot will be described below.

<Example of Multiplex Method in Configuration 1 for Mini-Slot>

Figure 6:
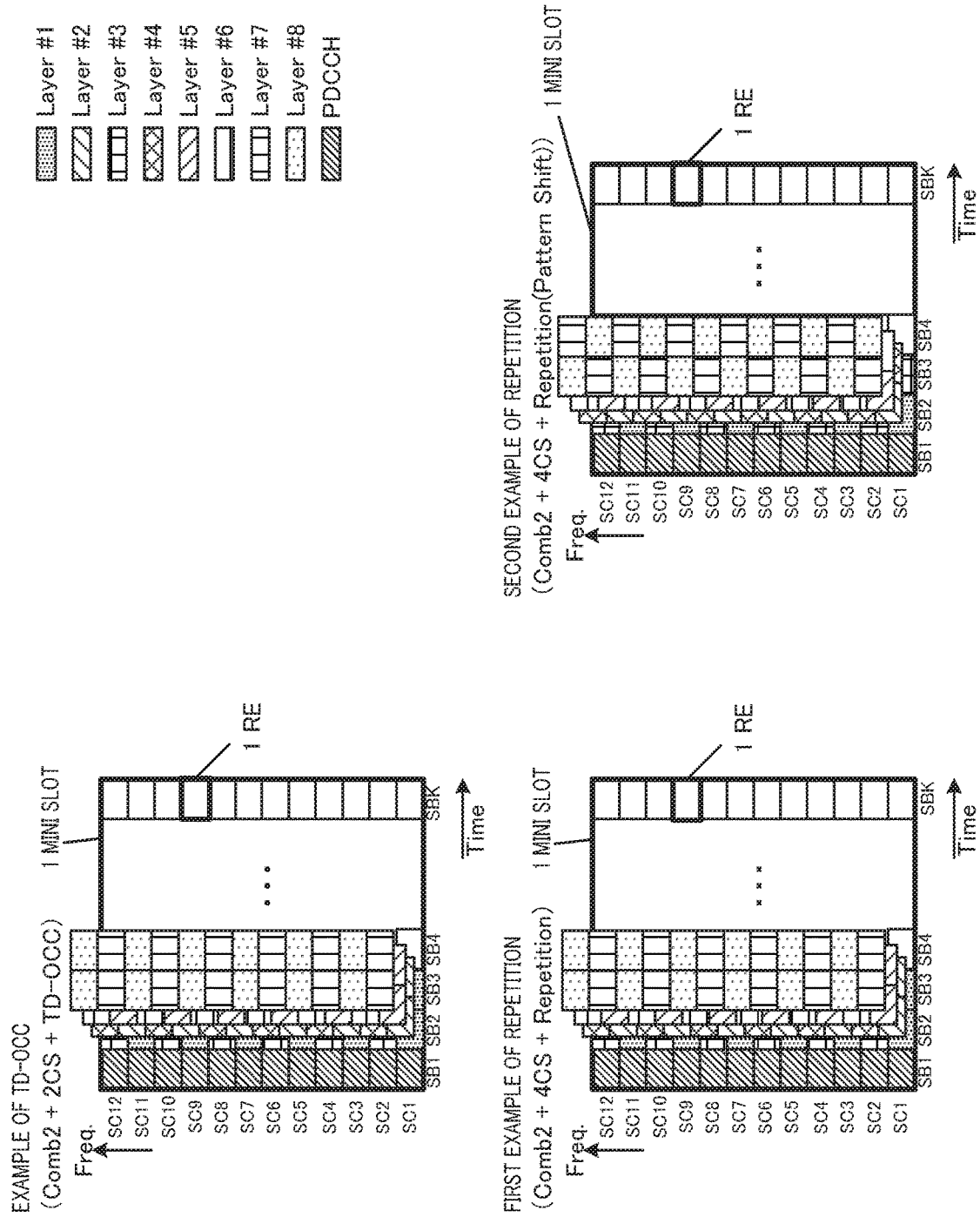
FIG. 6 is a diagram of mapping patterns illustrating an example of two multiplex methods in the time direction in configuration 1 in the case of a mini-slot.

FIG. 6 is a diagram of mapping patterns illustrating an example of two multiplex methods in the time direction in configuration 1 in the case of the mini-slot. FIG. 6 shows an example of the TD-OCC and an example of the repetition in configuration 1, in the same manner as FIG. 4. Each mapping pattern indicates a mapping position of a DMRS of each layer in the mini-slot, which is a resource allocation unit.

The mini-slot in FIG. 6 has a configuration in which REs are arranged 12 (SC1-SC12) in the frequency direction and K (SB1-SBK) in the time direction, where K is an integer of 1 to 14 (part of the configuration is not shown).

Because a multiplex method in each example in FIG. 6 is the same as each example in FIG. 4 except that the allocation unit of resources is the mini-slot and a control signal channel (for example, PDCCH) is arranged on a first symbol (SB1), detailed description is omitted.

<Example of Multiplex Method in Configuration 2 for Mini-Slot>

Figure 7:
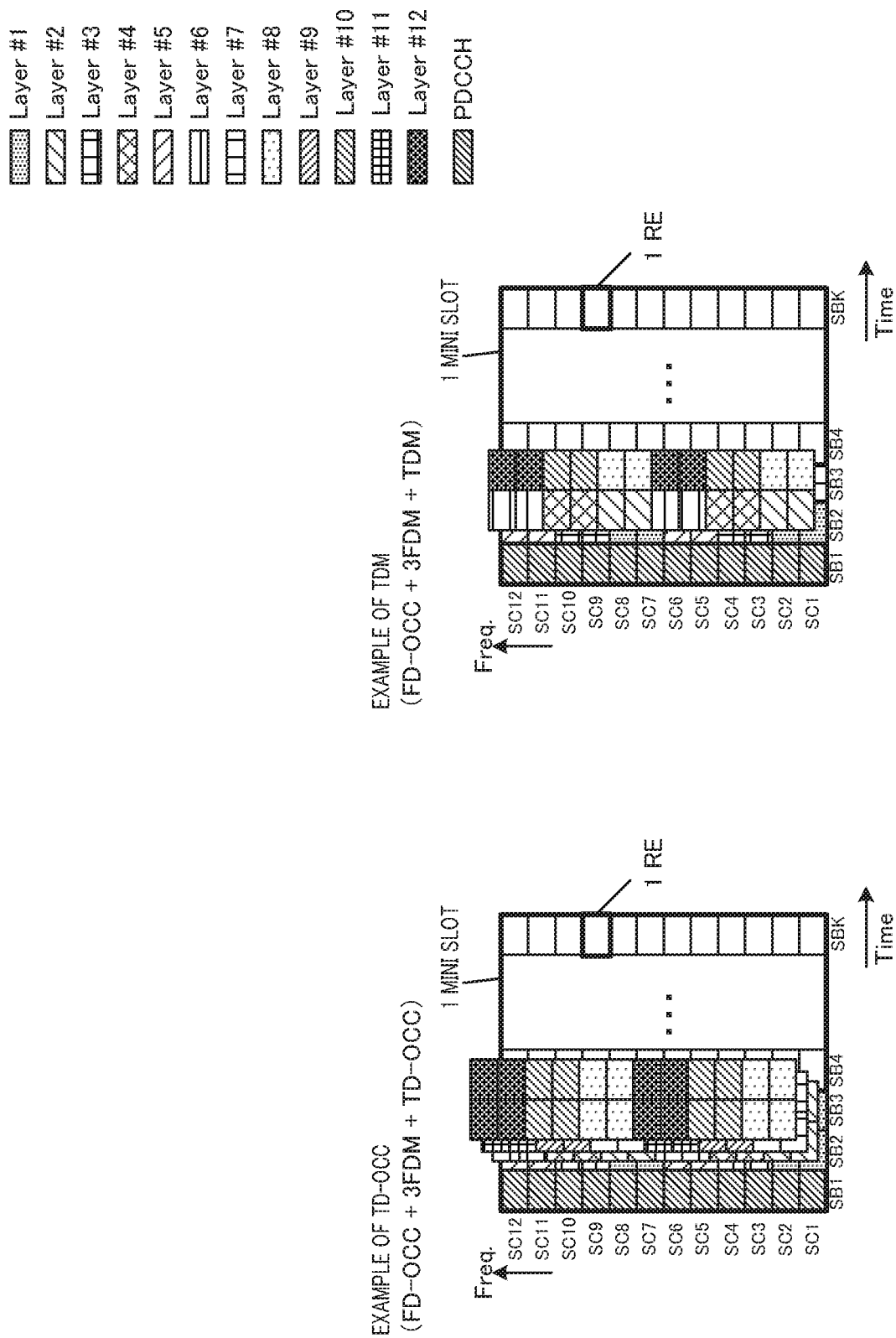
FIG. 7 is a diagram of mapping patterns illustrating an example of two multiplex methods in the time direction in configuration 2 in the case of the mini-slot.

FIG. 7 is a diagram of mapping patterns illustrating an example of two multiplex methods in the time direction in configuration 2 in the case of the mini-slot. FIG. 7 shows an example of the TD-OCC and an example of the TDM in configuration 2, in the same manner as FIG. 5. Each mapping pattern indicates a mapping position of a DMRS of each layer in the mini-slot, which is a resource allocation unit.

The mini-slot in FIG. 7 has a configuration in which REs are arranged 12 (SC1-SC12) in the frequency direction and K (SB1-SBK) in the time direction, where K is an integer of 1 to 14 (part of the configuration is not shown).

Because a multiplex method in each example in FIG. 7 is the same as each example in FIG. 5 except that the allocation unit of resources is the mini-slot and a control signal channel (for example, PDCCH) is arranged on a first symbol (SB1), detailed description is omitted.

<Advantageous Effects of Embodiment of the Invention>

In the embodiment of the invention, a multiplex method in the time direction supported in one configuration is selected on the basis of a prescribed parameter. Thereby, for example, it is possible to avoid deterioration in characteristics of DMRSs of a plurality of layers multiplexed by the TD-OCC due to the impact of phase noise, and thereby avoid deterioration in channel estimation accuracy by DMRSs.

In the embodiment of the invention, the example in which one RU is composed of 14 symbols and 12 subcarriers has been described, but the invention is not limited to this. The size of the RU may be changed.

In the embodiment of the invention, examples in which a control signal channel (for example, PDCCH) is arranged on REs of first two symbols of the RU (that is, SB1 and SB2) and REs of first one symbol of the mini-slot have been described, but arrangement of the control signal channel is not limited to this. In addition, the control signal channel may not be arranged in the RU, and may be arranged only on some REs.

The number of layers (the number of ports) in the embodiment of the invention is merely an example, and the invention is not limited to this.

In the above-described embodiment, a DMRS (front-loaded DMRS) arranged at the head of the RU has been described as an example, but the invention is not limited to this. For example, In addition to the front-loaded DMRS, an additional DMRS may be arranged. The additional DMRS is a DMRS arranged, for example, in order to enhance followability of a channel to time variation in the case where user terminal 20 is moving at a high speed.

A DMRS to which the invention is applied is not particularly limited. For example, the invention may be applied only to the above-described front-loaded DMRS, may be applied only to the additional DMRS, and may be applied to both.

In the above-described embodiment, the DMRS in the downlink signal transmitted from radio base station 10 to user terminal 20 has been mainly described as an example, but the invention is not limited to this. The present invention is also applied to a DMRS in the uplink signal transmitted from user terminal 20 to radio base station 10. In this case, radio base station 10 may select a configuration of the mapping pattern of DMRSs in the uplink signal, select a multiplex method in the time direction for the selected configuration, and notify user terminal 20 of information including a selection result by signaling.

The signaling in the above-described embodiment may be individually performed on user terminal 20 and may be performed for each specific unit. For example, common signaling may be used for each resource unit to be allocated, for each sub-band, for each resource block group (RBG), for each component carrier (CC), for each cell, and for each carrier frequency.

The signaling may be performed periodically, and may be performed dynamically.

The RU and/or min-slot to which the invention is applied is not particularly limited. In the case where a wide range of carrier frequencies are supported, the invention may be applied to RUs and/or mini-slots at all the carrier frequencies, and the invention may be applied to RUs and/or mini-slots at some carrier frequencies.

Hereinbefore, each embodiment of the invention has been described.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 8:
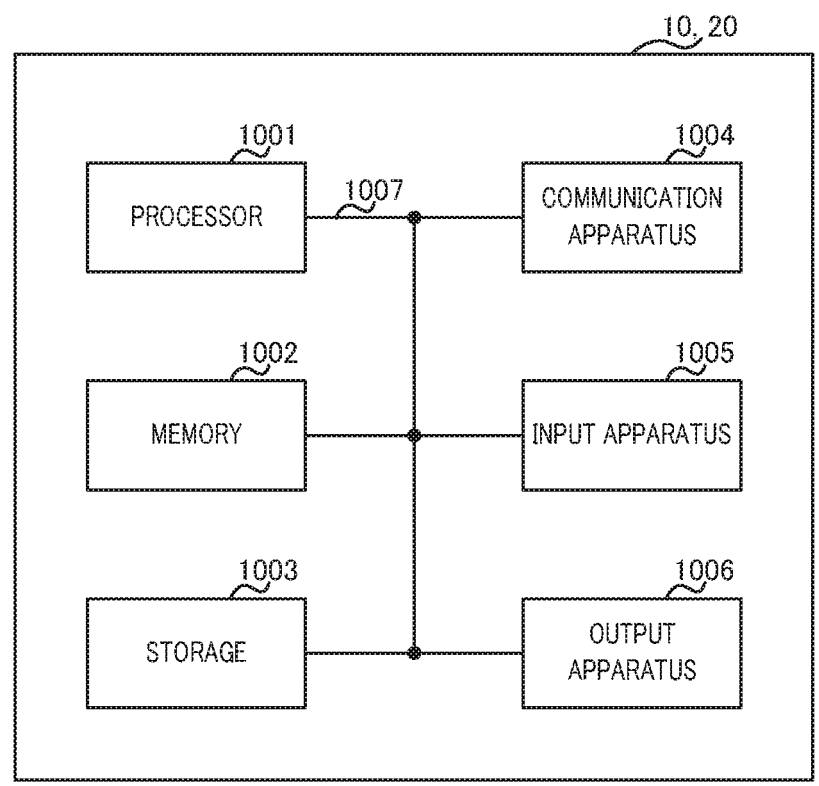
FIG. 8 illustrates an example of hardware configurations of a radio base station and a user terminal according to an embodiment of the invention.

For example, the radio base station, the user terminal, and the like according to an embodiment of the present invention may function as a computer that executes processing of a radio communication method of the present invention. FIG. 8 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, above-described scheduler 101, control sections 108 and 203, transmission signal generation sections 102 and 206, encoding and modulation sections 103 and 207, mapping sections 104 and 208, channel estimation sections 109 and 204, demodulation and decoding sections 110 and 205, and/or the like that may be configured by processor 1001.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 209, antennas 106 and 201, reception sections 107 and 202, and/or the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and/or the Like)

The orders of the processing procedures, the sequences, the flow charts, and/or the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and/or the like can be output from a higher layer (or a lower layer) to a lower layer (or a higher layer). The information, the signals, and/or the like may be input and output through a plurality of network nodes.

(Handling of Input and Output Information and/or the Like)

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like.

("System" and "Network")

The terms "system" and "network" used in the present specification can be interchangeably used.

(Names of Parameters and Channels)

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" can be interchangeably used in the present specification. The base station may be called a fixed station, a NodeB, an eNodeB (eNB), a gNodeB, an access point, a femto cell, a small cell, and/or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and/or the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. Furthermore, the DMRS may be called by other corresponding names, for example, a demodulation RS or DM-RS.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," and/or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini-slot, and the symbol indicate time units in transmitting signals. The radio frame, the subframe, the slot, the mini-slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one sub-frame, a plurality of consecutive sub-frames, one slot, or one mini-slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini-slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The above-described structure of the radio frame is illustrative only, and the number of sub-frames included in the radio frame, the number of slots included in a sub-frame, the number of mini-slots included in a sub-frame, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and/or the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio Base Station
20 User Terminal
101 Scheduler
102, 206 Transmission Signal Generation Section
103, 207 Encoding and Modulation Section 104, 208 Mapping Section
105, 209 Transmission Section
106, 201 Antenna
107, 202 Reception Section
108, 203 Control Section
109, 204 Channel Estimation Section
110, 205 Demodulation and Decoding Section

The invention claimed is:

1. A terminal, comprising:
a receiver that receives, from a base station apparatus, a downlink signal including demodulation reference signals of a plurality of ports multiplexed in a time direction; and
a processor that demaps a demodulation reference signal of a port allocated to the terminal from the downlink signal, and calculates a channel estimation value using the demapped demodulation reference signal,
wherein the processor identifies a multiplex method for the plurality of ports selected on the basis of at least one of a carrier frequency, propagation environment, performance of the terminal, and performance of the base station apparatus, and demaps the demodulation reference signal according to the identified multiplex method,
wherein the processor demaps the demodulation reference signal according to a method for multiplexing by applying an orthogonal sequence to the demodulation reference signals of the plurality of ports when the carrier frequency is less than a threshold value,
wherein the processor demaps the demodulation reference signal according to a method for time division multiplexing of the demodulation reference signals of the plurality of ports or a method for repetitively arranging the demodulation reference signals in the time direction, when the carrier frequency is equal to or more than the threshold value, and
wherein, when the terminal receives an instruction from the base station apparatus, the processor demaps the demodulation reference signal, regardless of the carrier frequency, according to the method for multiplexing by applying the orthogonal sequence, the method for time division multiplexing, or the method for repetitively arranging the demodulation reference signals in the time direction.

2. A channel estimation method in a terminal communicating with a base station apparatus, the channel estimation method comprising:
receiving, from the base station apparatus, a downlink signal including demodulation reference signals of a plurality of ports multiplexed in a time direction;
identifying a multiplex method for the plurality of ports selected on the basis of at least one of a carrier frequency, propagation environment, performance of the terminal, and performance of the base station apparatus and demapping a demodulation reference signal according to the identified multiplex method;
calculating a channel estimation value using the demodulation reference signal; and
demapping the demodulation reference signal according to a method for multiplexing by applying an orthogonal sequence to the demodulation reference signals of the plurality of ports when the carrier frequency is less than a threshold value,
demapping the demodulation reference signal according to a method for time division multiplexing of the demodulation reference signals of the plurality of ports or a method for repetitively arranging the demodulation reference signals in the time direction, when the carrier frequency is equal to or more than the threshold value, and
demapping the demodulation reference signal, regardless of the carrier frequency, according to the method for multiplexing by applying the orthogonal sequence, the method for time division multiplexing, or the method for repetitively arranging the demodulation reference signals in the time direction, when the terminal receives an instruction from the base station apparatus.

* * * * *